US012769448B2

(12) United States Patent
Cooper-Balis et al.

(10) Patent No.: US 12,769,448 B2
(45) Date of Patent: Oct. 20, 2026

(54) APPARATUSES, SYSTEMS, AND METHODS FOR LOW LATENCY SELECTION POLICY FOR MEMORY COMMANDS

(71) Applicant: Micron Technology, Inc., Boise, ID (US)

(72) Inventors: Elliott C. Cooper-Balis, San Jose, CA (US); Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 16 days.

(21) Appl. No.: 19/001,067

(22) Filed: Dec. 24, 2024

(65) Prior Publication Data

US 2025/0224872 A1 Jul. 10, 2025

Related U.S. Application Data

(60) Provisional application No. 63/619,397, filed on Jan. 10, 2024.

(51) Int. Cl.
*G06F 3/06* (2006.01)

(52) U.S. Cl.
CPC .......... *G06F 3/0611* (2013.01); *G06F 3/0659* (2013.01); *G06F 3/0673* (2013.01)

(58) Field of Classification Search
CPC .... G06F 3/0611; G06F 3/0659; G06F 3/0673; G06F 3/0658; G06F 3/0683
See application file for complete search history.

(56) References Cited

U.S. PATENT DOCUMENTS

2022/0317923 A1* 10/2022 Balakrishnan ........ G06F 3/0659
2023/0060826 A1* 3/2023 La Fratta .......... G11C 11/40603
2024/0220107 A1* 7/2024 Dutu ...................... G06F 3/061
2024/0312508 A1* 9/2024 Van Der Veen ............................ G11C 11/40611

* cited by examiner

*Primary Examiner* — Sean D Rossiter
(74) *Attorney, Agent, or Firm* — Dorsey & Whitney LLP

(57) ABSTRACT

Memory controller commands to be sent to a memory device may be prioritized based one or more factors. For instance, a memory controller may employ a first-ready, first-come, first-served (FRFCFS) policy in which certain types of commands (e.g., read) are prioritized over other types of commands (e.g., write). The policy may be modified so when deciding which bank to open, the bank with the oldest read command is opened. While continuing to issue commands per this modified FRFCFS policy, the controller may keep track of banks whose pages are ready to receive their respective read commands. Once a number of ready banks meets or exceeds a threshold, issuance of write commands are paused and read commands for the ready banks are issued.

17 Claims, 6 Drawing Sheets

APPARATUSES, SYSTEMS, AND METHODS FOR LOW LATENCY SELECTION POLICY FOR MEMORY COMMANDS

CROSS-REFERENCE TO RELATED APPLICATIONS

This application claims the filing benefit of U.S. Provisional Application No. 63/619,397, filed Jan. 10, 2024. This application is incorporated by reference herein in its entirety and for all purposes.

TECHNICAL FIELD

The present disclosure relates generally to memory, and more particularly, to apparatuses and methods associated with command selection policy.

BACKGROUND

Memory devices are typically provided as internal, semiconductor, integrated circuits in computers or other electronic devices. Data may be stored in memory cells, which can be arranged into arrays, with the arrays being used in the memory devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Various computing systems include processing resources (e.g., processors) that are coupled to memory devices, typically via a memory controller. The computing system (e.g., host system) may access the memory device via the memory controller in association with executing a set of instructions (e.g., a program, applications, etc.). The instructions may cause the memory controller to issue commands to the memory device. The memory device, memory controller, and/or both may implement a scheduling policy used to determine an order in which commands (e.g., reads and writes) based on the instructions received from the processing resources are executed by the memory device and/or sent by memory controller. Such scheduling policies can affect computing system performance since execution time of programs being executed on the computing system is affected by the execution time associated with access requests to the memory device, for example.

DETAILED DESCRIPTION

Figure 1:
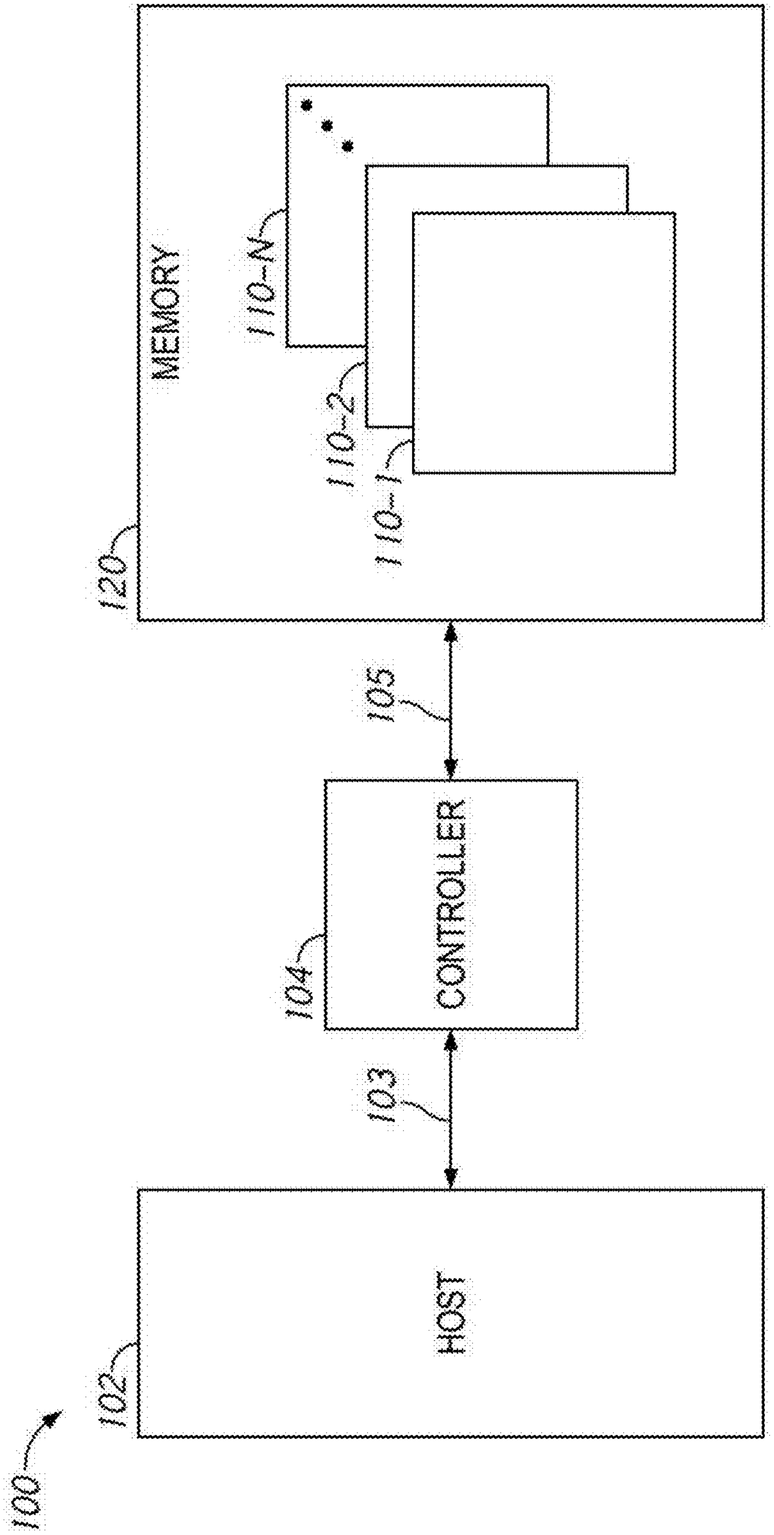
FIG. 1 is a block diagram of an apparatus in the form of a computing system including a memory system and capable of implementing a command selection policy in accordance with a number of embodiments of the present disclosure.

The present disclosure includes systems, apparatuses and methods related to command selection policy. The command selection policy may use command queue state and memory device row status to schedule commands. The techniques disclosed herein may reduce latency with minimal impact on data bus utilization (e.g., bandwidth) in some applications.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature so designated can be included with a number of embodiments of the present disclosure.

As used herein, "a number of" something can refer to one or more of such things. For example, a number of memory devices can refer to one or more of memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

As those skilled in the art appreciate, memory and storage arrays may be organized logically or physically, or both, in columns and rows. So, as used herein, a "column" command refers to a command directed to an address corresponding to an open (e.g., activated) row (e.g., page) of an array of the memory device, and a "row" command refers to a command directed to an address corresponding to a closed (e.g., deactivated) row of the array. Further, a number of embodiments can be implemented via execution of instructions stored on machine-readable media, which can include various non-transitory media including, but not limited to, volatile and/or nonvolatile memory, such as solid-state memories, phase-change memory, ferroelectric memory, optical media, and/or magnetic media among other types of machine readable media.

DRAM command scheduling is a complex operation where numerous physical and timing constraints must be considered in order to either maximize bandwidth, minimize latency, reduce power, or some combination thereof. Examples of existing command selection policies include FCFS (first-come, first-served) and FRFCFS (first-ready, first-come, first-served).

A FCFS policy can include scheduling commands received at a memory controller (e.g., from a host system) for execution by a memory device (e.g., a main memory such as a DRAM device) based on the order in which the commands were received by (e.g., decoded) the controller. Therefore, oldest commands are executed first. However, various memory systems include timing constraints that can affect whether a command can be issued (e.g., from the memory controller to the memory device). For example, various support circuitry associated with a memory array (e.g., row decode circuitry, column decode circuitry, sense amplifier circuitry, precharge circuitry, refresh circuitry, etc.) can include timing constraints that determine when/if the memory device is ready to execute a particular command. Accordingly, a FCFS policy can increase execution latency since a newer command may be capable of being executed by the memory device (e.g., based on the timing constraints) if issued by the controller, but the command cannot be provided to the memory device until the older command is executed under the FCFS policy.

A FRFCFS policy may reduce latency as compared to a FCFS policy. For example, in the FRFCFS policy, a memory controller may iterate through the command queue and select the first command it encounters that can be issued because the memory device is ready to execute the command. Therefore, an older command the memory device is not yet ready to execute (e.g., based on the timing constraints) may be skipped over in favor of a newer pending command that the memory device is ready to execute. When a command is capable of being executed by a memory device (e.g., the memory device is "ready" to execute the command), the command may be referred to as being "ready to issue" or "issuable" from the controller.

Neither the FCFS policy nor FRFCFS policy prioritizes types of access commands (e.g., read commands over write commands). U.S. Pat. No. 10,409,739, which is incorporated herein by reference for any purpose, describes prioritizing read commands, which may improve system performance since various instructions executed by a processing resource (e.g., a central processing unit) can be dependent on execution of other instructions. The '739 patent describes a command selection policy that prioritizes read commands over write commands, which can provide benefits such as reducing latency associated with read access requests to memory device. While an advance in the art, further improvements to latency and bandwidth may be desired.

The present disclosure describes a command selection policy that may reduce latency, and may further have marginal impact on bandwidth. Based on embodiments disclosed herein, the command policy may follow a FRFCFS policy with the following modification, when selecting a bank of a memory device to open (which may include selecting which ACT command to terminate), the bank associated with the oldest read command may be selected by the controller. Further, while issuing commands per the modified FRFCFS policy, the controller may keep track of a number of banks with pages ready to receive read commands (e.g., ready banks). In some embodiments, a bank may be considered "ready" when the row-to-column timing constraint (tRCD), also referred to as the RAS to CAS delay, has elapsed. Once the number of ready banks exceeds a threshold value, the controller may stop issuing write commands in accordance with the modified FRFCFS policy and issue read commands associated with the ready banks. Once the read commands associated with the ready banks have issued, the controller may return to issuing commands according to the modified FRFCFS policy.

Optionally, the threshold value for the number of ready banks may be dynamic based on a percentage of commands in the command queue that are read commands. For example, the threshold value may be lower when there are fewer read commands and the threshold value may be higher when there are more read commands.

Optionally, when a bank is considered to be a ready bank may be adjusted to be at a time before tRCD has elapsed. When a bank is determined to be ready after tRCD, there may be a delay in issuing a read command due to a write-to-read turnaround time. To reduce the delay, when a bank may be determined to be ready at a time earlier than tRCD. This earlier time may be based on a length of the write-to-read turnaround time. In this embodiment, a read command may be issued closer to the tRCD of the memory. This may reduce or eliminate incurring the additional write-to-read turnaround time penalty, which may further improve latency and/or bandwidth.

FIG. 1 is a block diagram of an apparatus in the form of a computing system 100 including a memory system 120 and capable of implementing a command selection policy in accordance with at least one embodiment of the present disclosure. As used herein, an "apparatus" can refer to, but is not limited to, a variety of structures or combinations of structures, such as a circuit or circuitry, a die or dice, a module or modules, a device or devices, or a system or systems. For example, controller 104, host 102, system 120, and/or devices 110-1 to 110-N may separately be referred to as an "apparatus".

In this example, the computing system 100 includes a host 102 coupled to a controller 104 (e.g., via an interface 103), which is coupled to the memory system 120 (e.g., via an interface 105). The computing system 100 can be a laptop computer, personal computers, digital camera, digital recording and playback device, mobile telephone, PDA, memory card reader, interface hub, sensor, Internet-of-Things (IoT) enabled device, among other systems, and the host 102 can include a number of processing resources (e.g., one or more processors) capable of accessing memory system 120 (e.g., via controller 104). The host 102 may be responsible for execution of an operating system (OS) and/or various applications that can be loaded thereto (e.g., from memory system 120 via controller 104).

The controller 104 may receive instructions, which may include memory transaction requests (e.g., in the form of read and write commands, which may be referred to as load and store commands, respectively) from the host 102. The controller 104 can transfer commands and/or data between the host 102 and the memory system 120 over the interfaces 103 and 105, which can include physical interfaces such as buses, for example, employing a suitable protocol. Such protocol may be custom or proprietary, or one or both interfaces 103 and 105 may employ a standardized protocol, such as Peripheral Component Interconnect Express (PCIe), Gen-Z, CCIX, or the like. The controller 104 can comprise control circuitry, in the form of hardware, firmware, or software, or any combination of the three. As an example, the controller 104 can comprise a state machine, a sequencer, and/or some other type of control circuitry, which may be implemented in the form of an application specific integrated circuit (ASIC) coupled to a printed circuit board. While controller 104 is shown separate from host 102 in FIG. 1, in a number of embodiments, the controller 104 may be co-located with the host 102 (e.g., in a system-on-chip (SOC) configuration). In a number of embodiments, the controller 104 may be co-located with the memory system 120. The controller 104 can be, for example, a controller such as controller 204 described in association with FIG. 2 and can be configured to implement a command selection policy in accordance with a number of embodiments of the present disclosure as described further below.

As shown in FIG. 1, the memory system 120 includes a number of memory devices 110-1, 110-2, . . . , 110-N, which may be referred to collectively as memory 110. The memory 110 can comprise a number of physical memory "chips," or dice which can each include a number of arrays (e.g., banks) of memory cells and corresponding support circuitry (e.g., address circuitry, I/O circuitry, control circuitry, read/write circuitry, etc.) associated with accessing the array(s) (e.g., to read data from the arrays and write data to the arrays). As an example, the memory devices 110-1 to 110-N can include a number of DRAM devices, SRAM devices, PCRAM devices, RRAM devices, FeRAM, phase-change memory, 3DXpoint, and/or Flash memory devices. In a number of embodiments, the memory system 120 can serve as main memory for the computing system. Although multiple memory devices 110-1, 110-2, . . . , 110-N are shown in FIG. 1, in some embodiments, memory system 120 may include a single memory device 110.

Figure 2:
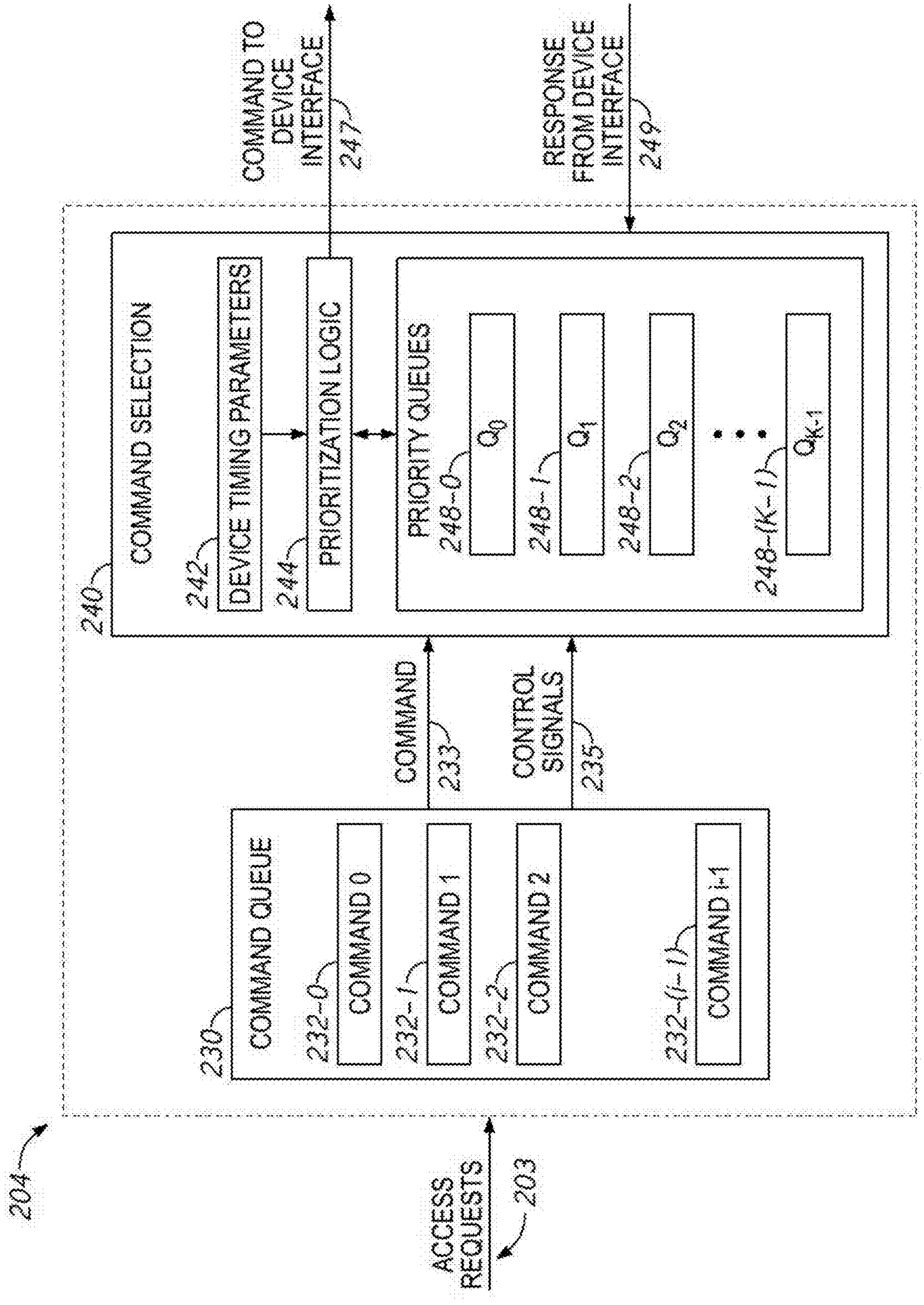
FIG. 2 is block diagram of a controller capable of implementing a command selection policy in accordance with a number of embodiments of the present disclosure.

FIG. 2 is block diagram of a controller capable of implementing a command selection policy in accordance with a number of embodiments of the present disclosure. The controller 204 can be at least a portion of a controller such as controller 104 shown in FIG. 1 in some embodiments. For example, the controller 204 can represent a command selection subsystem of controller 104 used to implement a particular command selection policy. As used herein, a command selection policy may be referred to as a command scheduling policy and can refer to selecting commands and/or scheduling (e.g., prioritizing) commands for issuance to a memory device.

The controller 204 includes a command queue 230 to store commands 232-0, 232-1, 232-2, . . . , 232-($i$−1) (referred to collectively as commands 232) associated with incoming access requests to a memory system (e.g., 120) received from a device such as a host (e.g., 102). The controller 204 can decode the incoming access requests (represented by arrow 203) and categorize the corresponding commands 232 in accordance with a desired command selection policy. As an example, received commands 232 can be categorized based on various factors including, but not limited to, command type (e.g., read or write), command address (e.g., whether the command targets an open or closed row of the memory device), and/or command age (e.g., time since being received), among various other factors including a relationship of one command to another (e.g., a read-after-write dependence).

As shown in FIG. 2, the controller 204 can include command selection logic 240 used to implement a desired command selection policy. In this example, the command selection logic 240 includes prioritized (priority) queues 248-0 (Q0), 248-1 (Q1), 248-2 (Q2), . . . , 248-($k$−1) (Qk−1), which can be referred to collectively as prioritized queues 248, as well as device timing parameter logic 242 and prioritization logic 244 used to implement a desired command selection policy. While multiple prioritized queues 248 are shown in FIG. 2, in some embodiments, only one prioritized queue 248 may be included.

The device timing parameter logic 242 can be responsible for tracking various timing constraints associated with accessing a memory device to which commands will be issued. Such timing constraints can include constraints such as timing of various control signals (e.g., read/write enable signals) and/or address signals (e.g., row/column address signals), among various other signals. For example, if the memory device is a DRAM device, such timing parameters can include a minimum time required between an activate command (a.k.a., activation command) and a column command (e.g., tRCD), a minimum time required between column commands (e.g., tCCD), a minimum time between a precharge command and an activate command (e.g., tRP), among various other timing parameters (e.g., tRAS, tCAS, tCP, tASR, tASC, tCAH, etc.). The various timing parameters may be provided to the timing parameter logic 242 from a memory system, memory device, and/or a host system coupled to the controller. The timing parameters may be stored in the controller (e.g., registers and/or other storage) in some embodiments either within in the device timing parameter logic 242 or in a separate component accessible to the device timing parameter logic 242.

The device timing parameter logic 242 can be used, for example, to determine whether commands in the prioritized queues 248 are ready to issue (e.g., whether the commands can be sent to the memory device for execution without violating the device timing parameters). As used herein, the term "queue" is not intended to be limited to a specific data structure implementation, but rather the term queue can refer to a collection of elements organized in various manners and which can have characteristics of one or more different types of queues and/or lists (e.g., a list, a linked list, etc.), among others.

The prioritization logic 244 can be responsible for iterating through the commands 232 in queue 230, determining designated priority categories for the received commands 232, inserting the commands 232 selected ones of the priority queues 248, and iterating through the queues 248 (in order of priority) to select a particular command to issue to the memory device. In FIG. 2, arrow 247 represents a selected command sent to the memory device, and arrow 249 represents a response (e.g., corresponding to the selected command) from the memory device. Arrow 233 represents a command 232 provided to command selection logic 240 for insertion into one of the priority queues 248 based on its designated category and corresponding priority level. Arrow 235 represents control signals associated with, for example, command selection logic 240 iterating through the commands 232 and removing commands 232 from queue 230 once they have been issued to the memory device.

In a number of embodiments, the prioritized queues 248 are indexed in priority order such that queue 248-0 has a highest priority and queue 248-($k$−1) has a lowest priority. Queues having different priorities may be referred to as having a first priority, a second priority, a third priority, and the like. The difference in priority of one queue is relative to another queue. So, a "higher" priority queue is given or has priority over another queue. The highest priority queue thus has the highest priority of the prioritized queues 248, and the lowest priority queue has the lowest priority of the prioritized queues 248.

In some embodiments, the prioritization logic 244 may assign each command 232 a priority designation. The priority designations can correspond to respective different priority queues 248 and/or position with a particular priority queue. For instance, commands receiving a designation corresponding to a highest priority are inserted into the highest priority queue 248-0, commands receiving a designation corresponding to a next highest priority are inserted into the next highest priority queue 248-1, etc. Additionally or alternatively, priority designations can determine where in a particular priority queue 248 the command is inserted. The designated priority category for each command 232 can be determined based on various factors including, but not limited to, whether the command is a read or write command, the type of read/write command (e.g., whether the command is a column read/write or a row read/write command), the age of the command, or a combination thereof.

The priority order of commands 232 within the respective one or more priority queues 248 can be based, at least in part, on the age of the commands such that the oldest command in a respective queue 248 has a highest priority and will be encountered first when iterating through the respective queue. As an example, iterating through at least some of the priority queues 248 or at least a portion of one priority queue 248 can include using a FRFCFS policy in which a first command ready for issuance (e.g., based on the device timing parameters) that is encountered is selected for issuance. However, when determining which bank of a memory device to open, the bank associated with the oldest read command may be selected by the prioritization logic 244 for issuance by the controller 204 to the memory device. In some instances, this may result in a prioritization of read commands over write commands.

Based, at least in part, on the commands issued from the priority queues 248, the prioritization logic 244 may keep track of how many banks of the memory device have pages ready to receive commands. For example, the prioritization logic 244 may include a counter that increments when a precharge command is issued for a bank and a tRCD has elapsed and decrements when an activation command is issued for a bank. Other techniques for counting the number of ready banks may be used in other embodiments. Before and/or after issuing a command from the priority queue 248, the prioritization logic may compare a value in the counter, which represents the number of ready banks, to a threshold value. Based on the comparison, the prioritization logic 244 may preempt the FRFCFS policy and issues read commands in the priority queues 248 that are associated with ready banks. For example, if the number of ready banks is equal to or greater than the threshold value, the prioritization logic 244 may preempt the FRFCFS policy. In some embodiments, a FRFCFS policy may be applied to determine the order of issuance of the read commands in the priority queues 248 associated with the ready banks. After the read commands associated with the ready banks have issued, the controller may return to issuing commands according to the modified FRFCFS policy.

Optionally, in some embodiments, the threshold value may be dynamic based on the conditions of the priority queues 248. For example, in some embodiments, the threshold value may be based on a number of read commands in the priority queues 248. The prioritization logic 244 may keep track of the number of read commands in the priority queues 248. For example, the prioritization logic 244 may include a counter that increments when a read command is provided from command queue 230 and may decrement when a read command is issued to the memory device from the priority queue 248. In some embodiments, the prioritization logic 244 may have a single counter for all of the priority queues 248-0 . . . 248-(K−1). In other embodiments, the prioritization logic 244 may have separate counters for each priority queue 248. Before and/or after issuing a command from the priority queue 248, the prioritization logic 244 may use a value in a counter representing the number of read commands in the priority queues 248 to select the threshold value used to determine if the FRFCFS policy should be preempted. In some embodiments, the prioritization logic 244 may make a determination based on the conditions of all of the queues 248 as a whole. In other embodiments, the prioritization logic 244 may make a determination for each queue 248 individually.

Table 1 provides an example of how threshold values may be selected based on a number of read commands that are in the priority queues 248. The number of read commands is expressed as a percentage of commands in the priority queues 248 that are read commands as the disclosure is not limited to queues that can hold a particular number of commands.

TABLE 1

Threshold Value Based on Percentage of Read Commands

| Read % in Queue | Threshold Value for Ready Banks |
|---|---|
| 0% to 25% | 1 |
| 25.01% to 50% | 2 |
| 50.01% to 60% | 6 |
| 60.01% to 100% | 8 |

The values shown in Table 1 are provided merely as an example. Different percentages of read commands may be associated with different threshold values in other embodiments. Furthermore, in some embodiments, the threshold values in Table 1 may be for a 1-rank memory system. In 2-rank memory systems, the threshold values may be double those shown. For example when read commands represent 0-25% of the commands in the priority queues 248, the threshold value may be two for a 2-rank memory system. In some applications, having a dynamic threshold value may reduce the risk of write commands getting unacceptably delayed by frequent FRFCFS policy preemption.

While the controller 204 is shown having both a command queue 230 and a priority queue 248, in some embodiments, the controller 204 may omit the priority queue 248. In this embodiment, the prioritization logic 244 may assign priority designations to commands, iterate through the command, and/or select commands for issuance directly from the command queue 230 based on the command selection policy.

Figure 3:
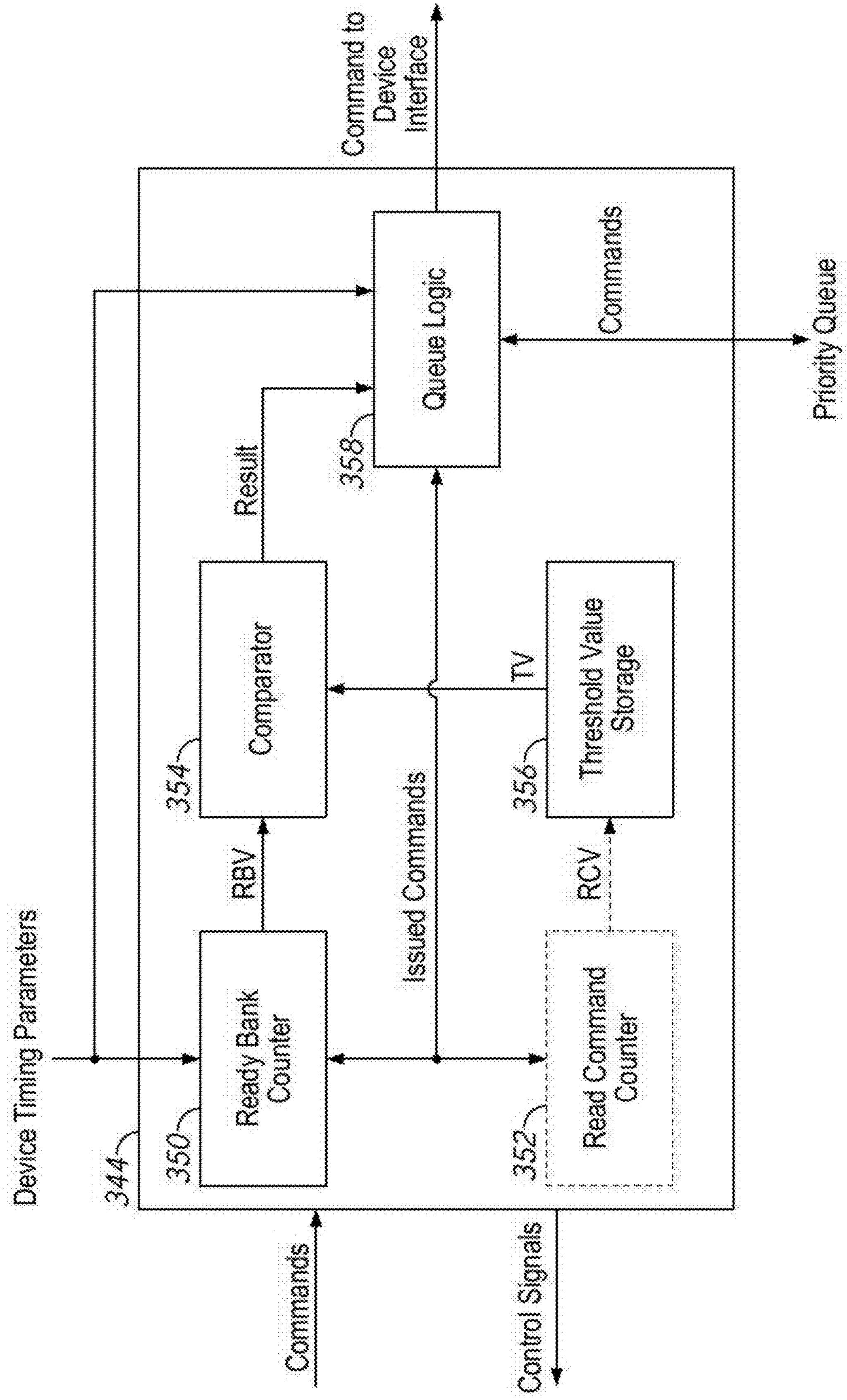
FIG. 3 is a functional block diagram of prioritization logic in accordance with a number of embodiments of the present disclosure.

FIG. 3 is a functional block diagram of prioritization logic in accordance with a number of embodiments of the present disclosure. The prioritization logic 344 may be included in the prioritization logic 244 shown in FIG. 2 in some embodiments. The prioritization logic 344 includes a ready bank counter 350, a comparator 354, a threshold value storage 356, and queue logic 358. Optionally, the prioritization logic 344 may include a read command counter 352. The prioritization logic 344 may receive commands from a command queue, such as command queue 230 and may provide control signals to the command queue. The prioritization logic 344 may provide commands to a device interface, such as a memory device interface. For example, commands may be provided to a memory system, such as memory system 120.

The queue logic 358 may receive commands from the command queue and place the commands in appropriate positions in a priority queue (or in one of multiple priority queues), such as the priority queue 248. The queue logic 358 may assign priority designations to the received commands in some embodiments as described with reference to FIG. 2. The queue logic 358 may further select commands to issue to the device interface based on a command selection policy according to embodiments of the present disclosure. The queue logic 358 may provide a signal indicating commands that have issued to the ready bank counter 350 and the read command counter 352.

The ready bank counter 350 may receive device timing parameters (and/or information related to device timing parameters), such as from the device timing parameter logic 242, and signals indicating the commands that have been issued from the queue logic 358. Based at least in part, on the issued commands and the device timing parameters, the ready bank counter may count a number of banks with pages open that are ready to receive commands (e.g., read and write commands). Optionally, in some embodiments, the ready bank counter also stores the addresses of the ready banks and may provide them to the queue logic 358. In other embodiments, the addresses may be stored in the queue logic 358 or another component of the priority logic 344. The ready bank counter 350 may increment a value of the number of ready banks when a tRCD has elapsed after issuance of an activation command for a bank. The ready bank counter 350 may decrement when a precharge command is issued for a bank. Other techniques for counting the number of ready banks may be used in other embodiments. The ready bank counter 350 may provide the value of the number of ready banks (RBV) to the comparator 354.

The comparator 354 may receive the number of ready banks RBV from the ready bank counter and a threshold value (TV) from the threshold value storage 356. The comparator 354 may compare the number of ready banks to the threshold value and provide a result of the comparison to the queue logic 358. In some embodiments, the result may be provided after a command is issued to the device interface, before a command is issued to the device interface, or a combination thereof.

In some embodiments, the threshold value storage 356 may include one or more registers for storing one or more threshold values. However, other storage techniques may be used in other embodiments. Optionally, the threshold value provided by the threshold value storage 356 may be dynamic.

In some embodiments, the read command counter 352 may count a number of read commands in the priority queue. In some embodiments, the read command counter 352 may increment through the priority queue to count the number of read commands directly. In some embodiments, the read command counter 352 may increment a value of the number of read commands in the priority queue each time a read command is received from the command queue and decrement the value of the number of read commands in the priority queue each time a read command is issued by the queue logic 358. Other techniques for counting the number of read commands in the priority queue may be implemented in other embodiments.

The value indicating the number of read commands in the priority queue (RCV) may be provided from the read command counter 352 to the threshold value storage 356. In these embodiments, the threshold value storage 356 may further include a comparator or other selection logic that receives the RCV and determines which of multiple threshold values to provide to the comparator 354 based on the RCV. An example of how the threshold value may be selected based on the RCV is shown in Table 1 and its accompanying description.

The queue logic 358 may be configured to organize the priority queue and issue commands based in part on the commands received from the command queue and the device timing parameters. The commands may be issued according to a FRFCFS policy, except that when determining which bank of a memory device to open, the bank associated with the oldest read command may be selected (e.g., a modified FRFCFS policy). The queue logic 358 may further receive the result from the comparator 354. Based on the result, the queue logic 358 may preempt the modified FRFCFS policy. For example, if the result indicates the number of ready banks is equal to or greater than the threshold value, the queue logic 358 may issue read commands from the priority queue that are associated with the ready banks rather than following the modified FRFCFS policy. After the read commands have been issued, the queue logic 358 may return to issuing commands based on the modified FRFCFS policy.

Figure 4:
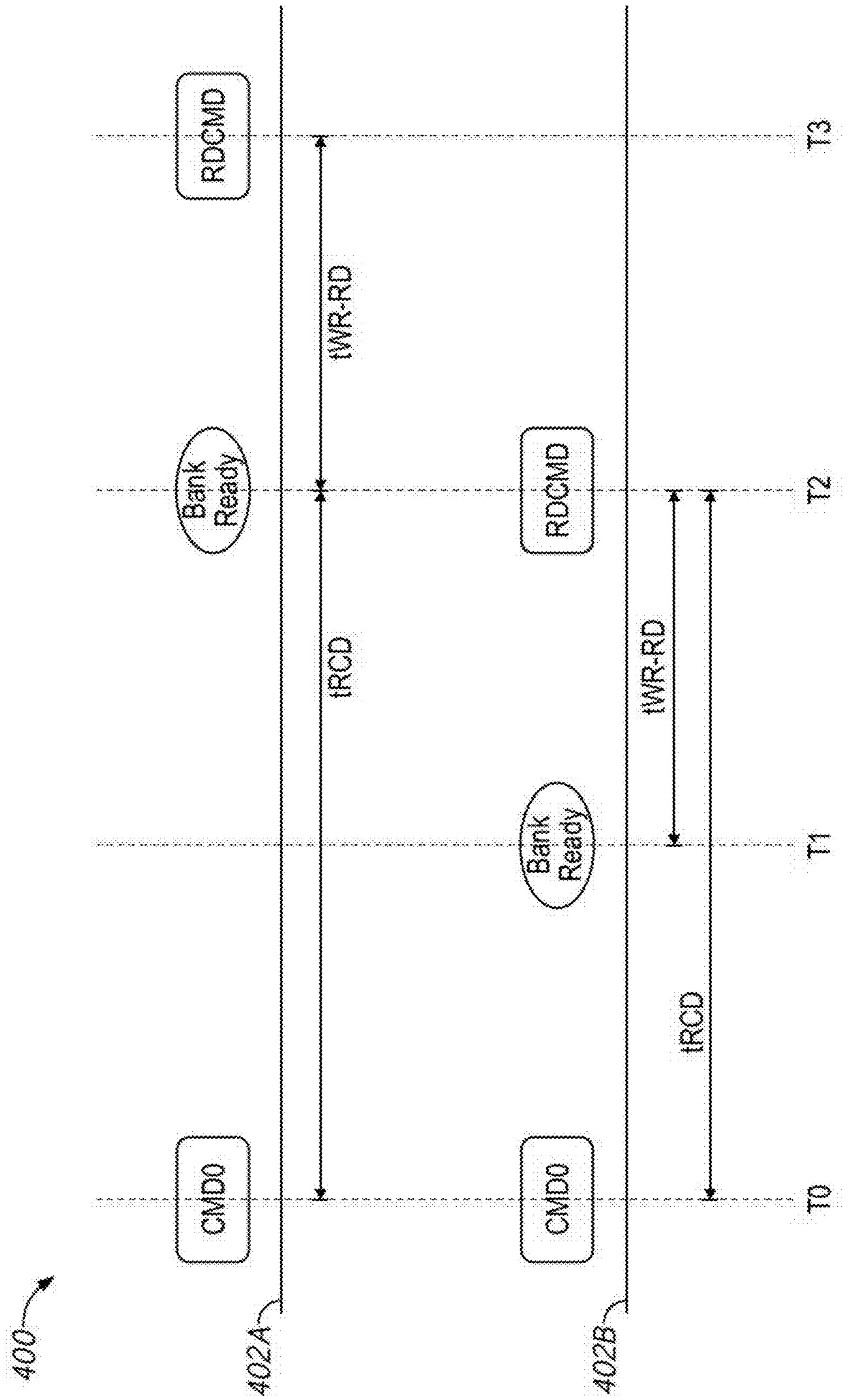
FIG. 4 is a timing diagram illustrating when a bank is determined to be ready by priority logic according to a number of embodiments of the present disclosure.

FIG. 4 is a timing diagram illustrating when a bank is determined to be ready by priority logic according to a number of embodiments of the present disclosure. The timing diagram 400 shows two examples 402A and 402B of when a bank is determined to be ready by priority logic. In some embodiments, the determination made be made, at least in part, by a ready bank counter, such as ready bank counter 350.

In example 402A, at or around time T0, a command (CMD0) is issued to the memory device. The command may be an activate command in some embodiments. After a period of tRCD has passed, at or around time T2, the bank associated with CMD0 may be determined to be ready. However, in some instances (e.g., a previous access command was a write command), a write-to-read turnaround time (tWR-RD) may need to elapse prior to issuance of the read command RDCMD at or around time T3. This may lead to delays in issuing commands, particularly read commands during preemption of the modified FRFCFS policy.

In example 402B, again, at or around time T0, command CMD0 is issued to the memory device. However, unlike in example 402A, instead of determining the bank is ready after time tRCD has passed at or around time T2, the bank is determined to be ready at or around time T1. Time T1 may be at a time equal to (tRCD-tWR-RD). Thus, the turnaround between write and read commands such that tRCD and tWR-RD elapse at the same or nearly the same time. The subsequent read command RDCMD may then issue at or around time T2 rather than at time T3. This may reduce delays in issuing commands in some embodiments, which may reduce latency.

Optionally, in some embodiments, the bank may be determined to be ready at a time later than (tRCD-tWR-RD) such that the read command RDCMD is issued after time T2 (but before T3). This may be desirable in applications where there is a concern that there is some variation in tRCD and/or tWR-RD that may cause a read command to issue prior to tRCD.

Figure 5:
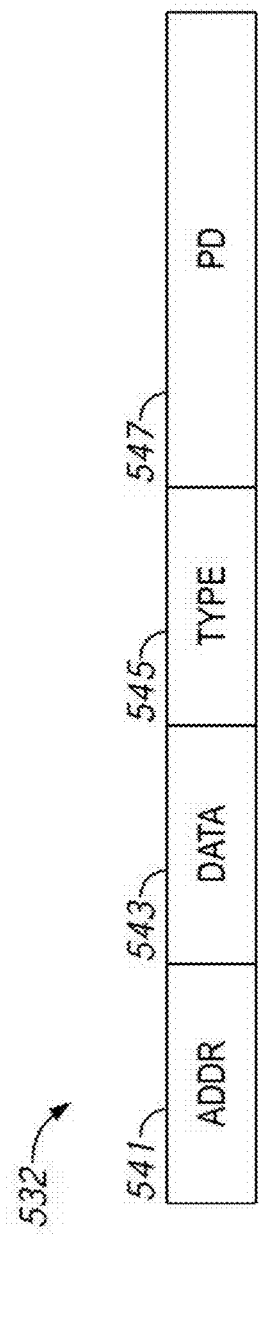
FIG. 5 illustrates an example of a command associated with implementing a command selection policy in accordance with a number of embodiments of the present disclosure.

FIG. 5 illustrates an example of a command associated with implementing a command selection policy in accordance with a number of embodiments of the present disclosure. In this example, command 532 includes a number of fields: Address field 541 (ADDR), data field 543 (DATA), command type field 545 (TYPE), and priority designation field 547 (PD). Embodiments are not limited to a particular command structure, quantity of fields, etc. In this example, address field 541 can include the row and column address of the command, data field 543 can include data corresponding to the command (e.g., data to be stored in or data read from memory), command type field 545 can indicate a command type (e.g., whether the command is a read or write), and priority designation field 547 can indicate additional state information that may be used by a command selection policy, such as the age of the command and whether the command targets a currently open row, among other state information. For example, priority designation field 547 may include information indicating the priority designation as discussed with reference to FIG. 2. The command shown in FIG. 5 is provided merely as an example, and the commands may have different structures in other embodiments.

Figure 6:
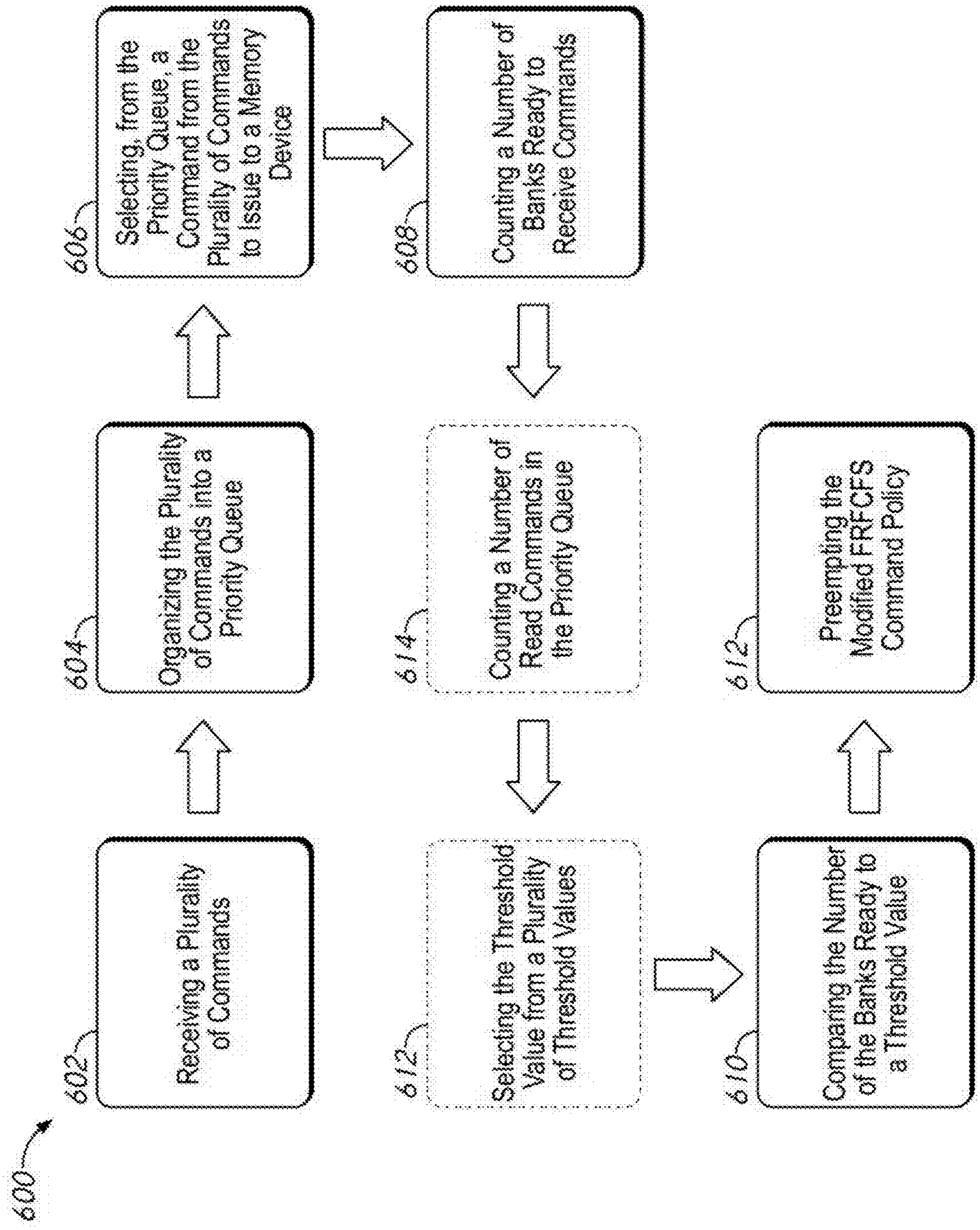
FIG. 6 is a flow chart of a method in accordance with a number of embodiments of the present disclosure.

FIG. 6 is a flow chart of a method in accordance with a number of embodiments of the present disclosure. The method 600 may be performed by a controller, such as controller 104 and/or controller 204 in some embodiments. The method 600 may be performed in whole or in part by command selection logic, such as command selection logic 240 in some embodiments.

At block 602, "receiving a plurality of commands" may be performed. The commands may be received at a controller, such as controller 104 and/or controller 204 in some embodiments.

At block 604, "organizing the plurality of commands into a priority queue" may be performed. The organizing may be performed by prioritization logic, such as prioritization logic 244 and/or 344 in some embodiments.

At block 606, "selecting, from the priority queue, a command from the plurality of commands to issue to a memory device" may be performed. The selecting may be performed by the prioritization logic. In some embodiments, the selection may be based on a first-ready, first-come, first-served (FRFCFS) command selection policy, wherein the FRFCFS command selection policy is modified such that a bank of the memory device associated with an oldest read command is opened.

In some embodiments, method 600 may further include block 608 where "counting a number of banks ready to receive commands" may be performed. The counting may be performed by a counter, such as counter 350 in some embodiments.

At block 610 "comparing the number of the banks ready to a threshold value" may be performed. In some embodiments, the comparing may be performed by a comparator, such as comparator 354. In some embodiments, the threshold value may be received from a threshold value storage, such as threshold value storage 356.

Based on the comparing, at block 612 "preempting the modified FRFCFS command policy" may be performed. Preempting may include selecting at least one read command of the plurality of commands associated with at least one of the banks ready to receive commands to issue to the memory device. In some embodiments, method 600 may further include selecting a second command from the plurality of commands to issue to the memory device according to the modified FRFCFS policy after the at least one read command has issued.

Optionally, method 600 may further include block 614 where "counting a number of read commands in the priority queue" and block 616 where "selecting the threshold value from a plurality of threshold values." The counting may be performed by counter 352 in some embodiments. The selecting may be based, at least in part, on the number of read commands in the priority queue. While blocks 614 and 616 are shown after block 608, block 615 and/or 616 may be performed before and/or at least partially concurrently with block 608.

In some embodiments, the threshold value is greater when the number of read commands in the priority queue is greater and the threshold value is lower when the number of read commands in the priority queue is lower.

In some embodiments, counting the number of banks ready to receive commands comprises determining a bank is ready based, at least in part, on a timing parameter of the memory device. In some embodiments, the timing parameter comprises a row-to-column timing constraint (tRCD) of the memory device. In some embodiments, the bank is determined to be ready after the tRCD has elapsed. In some embodiments, the bank is determined to be ready at a time before the tRCD has elapsed based, at least in part, on a write-to-read turnaround time of the memory device.

Based on embodiments disclosed herein, the command policy may follow a FRFCFS policy with the following modification, when selecting a bank of a memory device to open, the bank associated with the oldest read command may be selected by the controller. Further, while issuing commands per the modified FRFCFS policy, the controller may keep track of a number of banks with pages ready to receive read commands (e.g., ready banks). Once the number of ready banks exceeds a threshold value (which may be dynamic), the controller may stop issuing write commands in accordance with the modified FRFCFS policy and issue read commands associated with the ready banks then return to issuing commands according to the modified FRFCFS policy. The command selection policies disclosed herein, and the apparatuses and methods for implementing the command selection policies, may reduce latency, and may further have marginal impact on bandwidth.

It is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method comprising:
receiving a plurality of commands at a controller;
organizing the plurality of commands into a priority queue;
selecting, from the priority queue, a command from the plurality of commands to issue to a memory device based on a first-ready, first-come, first-served (FRFCFS) command selection policy, wherein the FRFCFS command selection policy is modified such that a bank of the memory device associated with an oldest read command is opened;
counting, with the controller, a number of banks ready to receive commands;
comparing the number of the banks ready to a threshold value; and
based on the comparing, preempting the modified FRFCFS command policy and selecting at least one read command of the plurality of commands associated with at least one of the banks ready to receive commands to issue to the memory device.

2. The method of claim 1, further comprising selecting a second command from the plurality of commands to issue to the memory device according to the modified FRFCFS policy after the at least one read command has issued.

3. The method of claim 1, further comprising:
counting, with the controller, a number of read commands in the priority queue; and
selecting the threshold value from a plurality of threshold values based, at least in part, on the number of read commands in the priority queue.

4. The method of claim 3, wherein the threshold value is greater when the number of read commands in the priority queue is greater and the threshold value is lower when the number of read commands in the priority queue is lower.

5. The method of claim 1, wherein counting the number of banks ready to receive commands comprises determining a bank is ready based, at least in part, on a timing parameter of the memory device.

6. The method of claim 5, wherein the timing parameter comprises a row-to-column timing constraint (tRCD) of the memory device.

7. The method of claim 6, wherein the bank is determined to be ready after the tRCD has elapsed.

8. The method of claim 6, wherein the bank is determined to be ready at a time before the tRCD has elapsed based, at least in part, on a write-to-read turnaround time of the memory device.

9. An apparatus comprising:
a device timing parameter logic configured to store timing constraints of a memory device;
a command queue configured to store a plurality of commands;
a prioritization logic configured to select commands from the plurality of commands to issue to the memory device, wherein the commands are selected based, at least in part on the timing constraints and a first-ready, first-come, first-served (FRFCFS) command selection policy, wherein the FRFCFS command selection policy is modified such that a bank of the memory device associated with an oldest read command is opened;
a counter configured to count a number of banks of the memory device ready to receive commands;
a threshold value storage configured to store a threshold value; and
a comparator configured to compare the number of banks ready to the threshold value and provide a result to the prioritization logic,
wherein the prioritization logic is further configured to preempt the modified FRFCFS command policy and select at least one read command of the plurality of commands associated with at least one of the banks ready to receive commands to issue to the memory device.

10. The apparatus of claim 9, further comprising:
a second counter configured to count a number of read commands in the command queue and provide the number to the threshold value storage,
wherein the threshold value storage is configured to store a plurality threshold values, and the threshold value is selected from the plurality of threshold values to be provided to the comparator based on the number of read commands in the command queue.

11. The apparatus of claim 10, wherein the plurality of threshold values are greater when the memory device is a multi-rank memory device and lower when the memory device is a single rank memory device.

12. The apparatus of claim 9, wherein the counter is configured to count a bank of the memory device as ready to receive a command when a row-to-column timing constraint (tRCD) of the memory device has elapsed.

13. The apparatus of claim 9, wherein the counter is configured to count a bank of the memory device as ready to receive a command when a time less than the tRCD has elapsed, but no less than a time equal to tRC minus a write-to-read turnaround time of the memory device.

14. A system comprising:
a memory system comprising a plurality of memory devices;
a host system configured to issue a plurality of commands; and
a controller configured to receive the plurality of commands from the host system and issue the plurality of commands to the memory system, wherein the controller issues the plurality of commands based, at least in part on a first-ready, first-come, first-served (FRFCFS) command selection policy, wherein the FRFCFS command selection policy is modified such that a bank of at least one memory device of the plurality of memory devices associated with an oldest read command is opened,
wherein based on a number of banks of the plurality of memory devices that are ready to receive commands, the controller preempts the modified FRFCFS command policy and issues at least one read command of the plurality of commands associated with at least one of the banks ready to receive commands to at least one of the plurality of memory devices.

15. The system of claim 14, wherein the number of banks ready to receive commands that causes the controller to preempt the modified FRFCFS command policy is based, at least in part, on a number of read commands included in the plurality of commands.

16. The system of claim 14, wherein the number of banks ready to receive commands that causes the controller to preempt the modified FRFCFS command policy is based, at least in part on a number of memory devices included in the memory system.

17. The system of claim 14, wherein the controller is configured to resume the modified FRFCFS command policy after issuance of the at least one read command.

* * * * *